United States Patent
Souissi et al.

(10) Patent No.: US 7,319,715 B1
(45) Date of Patent: Jan. 15, 2008

(54) SYSTEMS AND METHODS FOR A MULTI-MODE WIRELESS MODEM

(75) Inventors: Slim S. Souissi, San Diego, CA (US); Michael Loh, Calgary (CA); Humphrey Gordon, Calgary (CA)

(73) Assignee: Novatel Wireless, Inc., San Diego, CA (US)

(*) Notice: Subject to any disclaimer, the term of this patent is extended or adjusted under 35 U.S.C. 154(b) by 926 days.

(21) Appl. No.: 10/028,080

(22) Filed: Dec. 21, 2001

(51) Int. Cl.
*H04B 1/38* (2006.01)

(52) U.S. Cl. ...................... 375/220; 375/222

(58) Field of Classification Search ............... 375/222, 375/220, 130; 455/557, 442; 361/683; 379/93.29
See application file for complete search history.

(56) References Cited

U.S. PATENT DOCUMENTS

| | | | | |
|---|---|---|---|---|
| 5,367,563 A * | 11/1994 | Sainton | .................... | 379/93.29 |
| 5,923,705 A * | 7/1999 | Willkie et al. | .............. | 375/220 |
| 5,940,438 A * | 8/1999 | Poon et al. | .................. | 375/222 |
| 6,132,223 A | 10/2000 | Seeley et al. | .............. | 439/76.1 |
| 6,282,086 B1 | 8/2001 | Loh et al. | .................... | 361/684 |
| 6,697,415 B1 * | 2/2004 | Mahany | ....................... | 375/130 |
| 6,708,045 B1 * | 3/2004 | Lieu et al. | ................... | 455/557 |
| 6,717,801 B1 * | 4/2004 | Castell et al. | ............... | 361/683 |
| 6,785,556 B2 * | 8/2004 | Souissi | ........................ | 455/557 |
| 6,870,733 B2 * | 3/2005 | Castell et al. | ............... | 361/683 |
| 6,915,142 B1 * | 7/2005 | Wietfeldt | .................... | 455/557 |
| 2002/0021690 A1 * | 2/2002 | Preiss et al. | ................. | 370/352 |
| 2002/0044571 A1 * | 4/2002 | Penet | .......................... | 370/506 |
| 2002/0077814 A1 * | 6/2002 | Garudadri et al. | .......... | 704/246 |
| 2004/0157609 A1 * | 8/2004 | Jalloul et al. | ............... | 455/442 |

OTHER PUBLICATIONS http://www.option.com/products/edge_spec.shtml.*
http://www.mc-technologies.net/html/cellular/fusion_gb.htm.*
Andelman, D. and Strupinksy, A., "Have WLANs Come Of Age?," *Wireless Systems Design*, Jul. 2001, 37-40.
"Market Engineering Research for the Wireless Home Networking Market 1998-2005," #5547-74, Frost & Sullivan (1999), www.frost.com, 8:1-33.
Conover, J., "Mobile & Wireless Technology, 802.11a: Making Space for Speed Workshop," Jan. 8, 2001; http://www.networkcomputing.com/1201/1201ws1.html, pp. 1-5 (visited Nov. 21, 2001).
"New Compaq 'MultiPort' Technology Delivers Integrated Wireless Connectivity to Mobile PC Users," http://www.compaq.com/newsroom/pr/2000/pr2000120501.html, pp. 1-3 (visited Nov. 21, 2001).
"Proxim White Paper, 802.11a: A Very-High-Speed, Highly Scalable Wireless LAN Standard," http://www.proxim.com/learn/library/whitepapers/wp2001-09-highspeed.html, pp. 1-5 (visited Nov. 21, 2001).

* cited by examiner

*Primary Examiner*—Don N. Vo
(74) *Attorney, Agent, or Firm*—Foley & Lardner, LLP

(57) ABSTRACT

A multi-mode modem comprises a first device configured to communicate with a first communication system, a second device configured to communicate with a second communication system, a processor communicatively coupled the first and second devices, and a control function configured to place the device in one of the following communication modes: 1) communication with the first communication system; 2) communication with the second communication system; 3) simultaneous communication with both the first and second communication systems; or 4) gateway communication between the first and second communication systems.

18 Claims, 11 Drawing Sheets

SYSTEMS AND METHODS FOR A MULTI-MODE WIRELESS MODEM

BACKGROUND OF THE INVENTION

1. Field of the Invention

The present invention relates generally to wireless communications, but more specifically to the configuration and operation of multi-mode wireless modems in a plurality of wireless communication systems.

2. Background

Consumer demand for high data rate services has helped fuel the expansion of the wireless communication industry. In effort to keep pace, the global wireless infrastructure has become an intricate patchwork of largely non-interoperative systems. Worse, to meet the demand for more wireless capability, it is expected that the industry will proliferate, not consolidate, the number of wireless telecommunications standards.

Currently a user wishing to gain access to multiple systems will often carry at least two devices, each device supporting a different system. For example, a personal computer capable of supporting a wireless modem for Institute of Electrical and Electronics Engineers (IEEE) 802.11 access must be re-equipped and re-configured with a different modem, say a Global Packet Radio System (GPRS) modem, when the user leaves the 802.11 coverage area and enters a GPRS only coverage area.

Familiar wireless wide-area network (W-WAN, or simply WAN) standards such as GPRS offer reasonable service quality at an affordable price and have relatively wide coverage. Unfortunately, for many high data rate applications, existing WAN technologies are too slow and expensive. On the other hand, wireless local-area network (W-LAN, or simply LAN) standards such as IEEE 802.11 have proven superior for use in very localized data applications. Moreover, LANs are faster, cheaper, and consume less power than their WAN counterparts. For many subscribers, especially corporate subscribers, LAN access is free—yet, for all practical purposes, a mobile subscriber is not afforded continuous LAN coverage throughout the day. That is, LAN coverage available to a subscriber at work does not usually extend to the subscriber's home. Therefore, it would be advantageous to provide a subscriber a way to switch systems in a more seamless fashion as he or she moves from system to system.

The current technique for managing such switching is clumsy and requires heavy subscriber involvement. Typically, as mentioned, the subscriber must "swap" modem devices. Further, a subscriber must also typically initiate dial-up connectivity upon leaving one system and entering a second. In many cases, multiple drivers and different software are needed for configuration and operation of the devices. Therefore, apart from being cumbersome for the subscriber to manage, swapping modems is also impractical.

Thus, the market would benefit from a single modem device systems that preferably conforms with a standard form factor and that comprises the technology required to access a plurality of communication systems. The design of such a "combinational" modem device, however, raises other concerns. For example, regardless of the form factor, space is almost always a concern in the design of wireless modem devices, especially when more than one wireless communication technology is supported. Further, designing, certifying, and manufacturing such a combinational modem device would be an expensive and lengthy task. A further concern is that there are so many different types of wireless communication systems. To cover all the possible combinations, many different combinational modem devices would need to be manufactured. Manufacturing a multitude of combinational modem devices increases manufacturing costs. Such concerns also need to be addressed in the design of a combinational, or multi-mode, modem in order for such a modem to provide convenient, efficient access to a plurality of wireless communication systems at an affordable cost.

SUMMARY OF THE INVENTION

To overcome the problems that result from the current mish mash of wireless communication systems and to ensure that a subscriber has access to the most convenient and optimal service at any given time, the systems and methods described herein provide for a single combinational modem device that can be easily reconfigured for different technology combinations after the manufacturing process. Thus, the systems and methods described herein present software and hardware architectures that can effectively support various technology combinations, methods for configuring the hardware and software architectures to achieve the most optimal operation, and cost effective methods to incorporate multiple technologies within modem devices in a manner that allows for easy reconfiguration after the manufacturing process.

As such, there is provided a system for wireless communication that comprises a host device comprising a processor and a multi-mode modem. The multi-mode modem comprises a first device configured to communicate with a first communication system, a second device configured to communicate with a second communication system, and an interface device coupled with at least on of the first and second devices. The interface device is configured to interface the first and second devices with the host processor. The system also includes a control function configured to place the device in one of the following communication modes: 1) communication with the first communication system, or 2) communication with the second communication system.

Other aspects, advantages, and novel features of the invention will become apparent from the following Detailed Description of Preferred Embodiments, when considered in conjunction with the accompanying drawings.

DETAILED DESCRIPTION OF THE DRAWINGS

Figure 1:
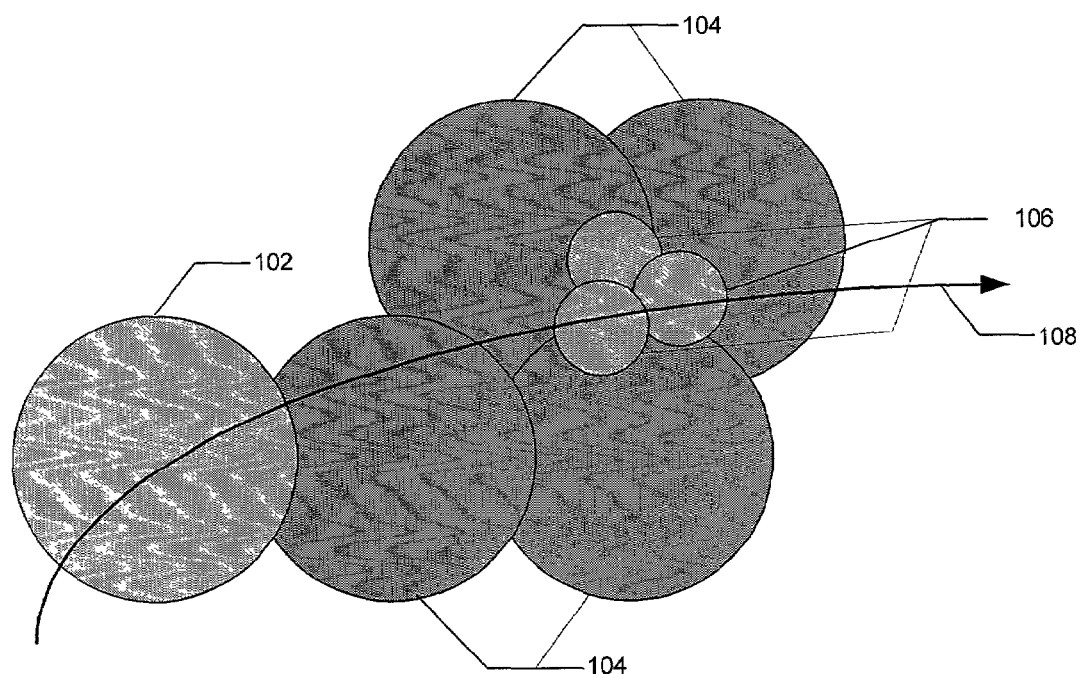
FIG. 1 is a diagram illustrating an exemplary patch work of wireless communication systems.

FIG. 1 illustrates how the coverage area for various different wireless communication systems can overlap. System 102 can, for example, be a WAN type system configured for data communication such as a Global Packet Radio Service (GPRS) or a 1×RTT data communication system. While systems 104 can, for example, be another type of WAN system, also configured for data or, alternatively, a WAN system configured for voice communication such as a GSM, IS-136, or IS-95 system. Systems 108 can be smaller LAN or personal area network (PAN) systems, which will typically be configured for high speed data communication. In general, however, it will be understood that systems 102, 104, and 106 can be any type of WAN, LAN, or PAN system. Further, as a subscriber moves through systems 102, 104, and 106 along a path such as path 108, for example, the subscriber may have service accounts on some or all of the systems.

If systems 102, 104, and 106 are data communication systems, for example, then the subscriber may be using a laptop or handheld computer, or possibly a personal digital assistant (PDA) device, with an appropriate modem card or module to access each system 102, 104, and/or 106. A common type of modem card used for laptop computers is a Personal Computer Memory Card International Association (PCMCIA) wireless modem card. The subscriber simply purchases the appropriate type of PCMCIA wireless modem card, e.g., GPRS or 1×RTT, and then installs it in an available PCMCIA slot in the laptop. The problem, as described above, is that the subscriber must remove the card and install another as he moves from system 102 in order to then access system 104 (assuming the subscriber has an account on both systems). This presents several problems briefly described above. First, the subscriber is probably not aware of the actual coverage areas of systems 102 and 104, and therefore may not be aware that he has a particular coverage area. Second, the subscriber must carry around and keep track of multiple cards. Third, the process of removing one card and installing another is inconvenient, especially when the fact that a new dial up connection may need to be established each time the subscriber wants to access a new system. The problems get worse when a third system, such as system 106, is factored in.

Figure 2:
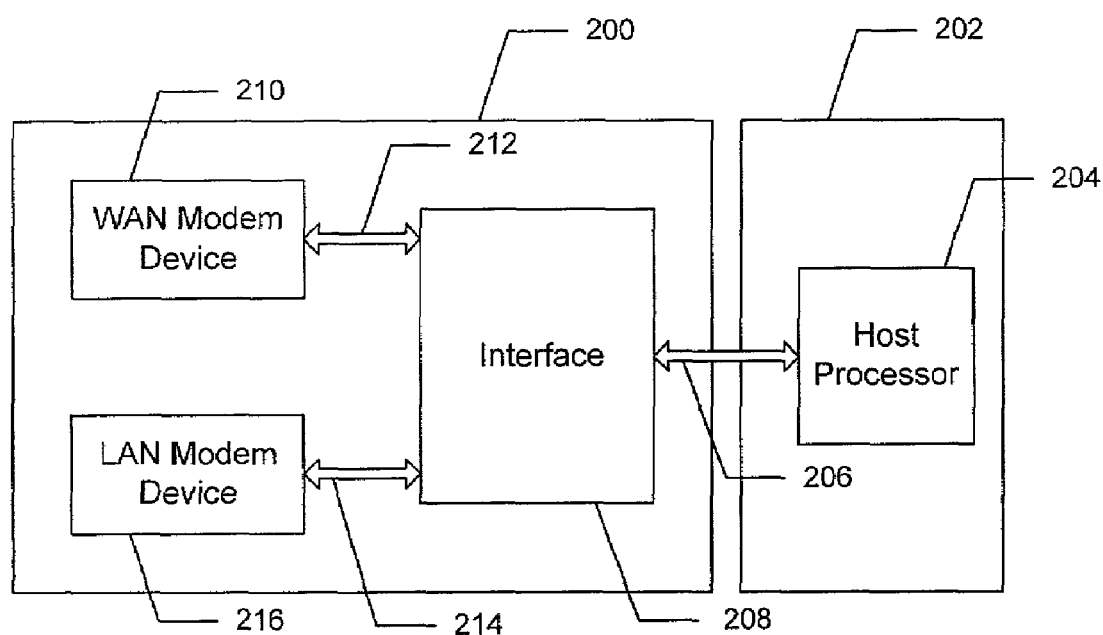
FIG. 2 is a logical block diagram illustrating one example embodiment of a multi-mode modem that can be used in the wireless communication systems of FIG. 1 in accordance with the invention.

FIG. 2 is a logical block diagram illustrating one example embodiment of a multi-mode modem 200 configured in accordance with the system and methods described herein. As can be seen, multi-mode modem 200 includes a first modem device 210 and a second modem device 216. It will be understood that both the first and second modem devices, 210 and 216, can be any type of WAN, LAN, or PAN modem device. Further, the first and second modem devices, 210 and 216, can be configured for data communication, voice communication, or both. For the sake of illustration, however, it will be assumed throughout the examples that follow that the first modem device 210 is a WAN modem device configured for data communication, such as a GPRS modem device, and that the second modem device 216 is a LAN modem device also configured for data communication, such as an IEEE 802.11 modem device. It should also be noted that the systems and methods described herein are not restricted to multi-mode modems comprising only two modem devices. The number of devices can, in fact, be more than two in which case the systems and methods described herein must simply be extended to cover the number of devices included in modem 200.

In addition to first and second modem devices, 210 and 216, multi-mode modem 200 further comprises and interface device 208 configured to interface modem devices 210 and 216 with host processor 204 in host device 202. Thus, for example, multi-mode modem 200 can be a PCMCIA modem card and host device 202 can be a laptop computer with the appropriate PCMCIA card slot. Alternatively, host device 202 can be a PDA or some other type of portable computing device, in which case multi-mode modem 200 is included in the appropriate type of card or module for use with the particular type of host device 200. Further, multi-mode modem 200 can be included in host device 202, in which case interface device 208 may not be needed. For the descriptions that follow, it is assumed that modem 200 is not within host device 202 and, therefore, interface device 208 is present.

As can be seen, interface device 208 communicates with first modem device 210 over communication interface 212, second modem device 216 over communication interface 214, and host processor 204 over communication interface 206. Specific implementations of multi-mode modem 200 are described below, including specific configurations for these interfaces.

Thus, to solve the problems described above, as the subscriber moves from system 104 to system 106 for example, multi-mode modem 200 can be configured to automatically switch from first modem device 210 to second modem device 216. In order to effectively integrate multiple modem devices, such as devices 210 and 216, into a multi-mode modem 200, however, several issues must be effectively overcome. First, a cost effective and efficient method for integrating multiple modem devices should be developed. Size and cost are ubiquitous concerns when it comes to the design of modem cards and modules. Integrating multiple modem devices into one modem only exacerbates these concerns. Therefore, a cost-effective method of integration that conserves space within modem 200 is an important aspect in the design of any multi-mode modem 200. Second, efficient hardware and software architectures should be used. Third, the most effective means of configure multi-mode modem 200 for various operating modes should be developed.

One example of a cost efficient method for integrating multiple modem devices 210 and 216 into a multi-mode modem 200 is described below. In addition, while, FIG. 2 illustrates one example of a high level hardware architecture for a multi-mode modem 200. Other alternative embodiments are described below, as are lower level hardware implementations. The software architecture will be described next in the context of configuring multi-mode modem 200 for various operational modes.

In a multi-mode modem 200 that incorporates two modem devices 210 and 216 there are 4 possible operation modes. Assuming modem device 210 is a WAN modem device and modem device 216 is a LAN modem device, then the possible modes are:

1) WAN mode in which modem device 210 is enabled;
2) LAN mode in which modem device 216 is enabled;
3) LAN-WAN simultaneous mode in which modem devices 210 and 216 are both enabled; and
4) LAN-WAN gateway mode in which modem 200 is configured to act as a gateway between the WAN and the LAN.

Figure 3:
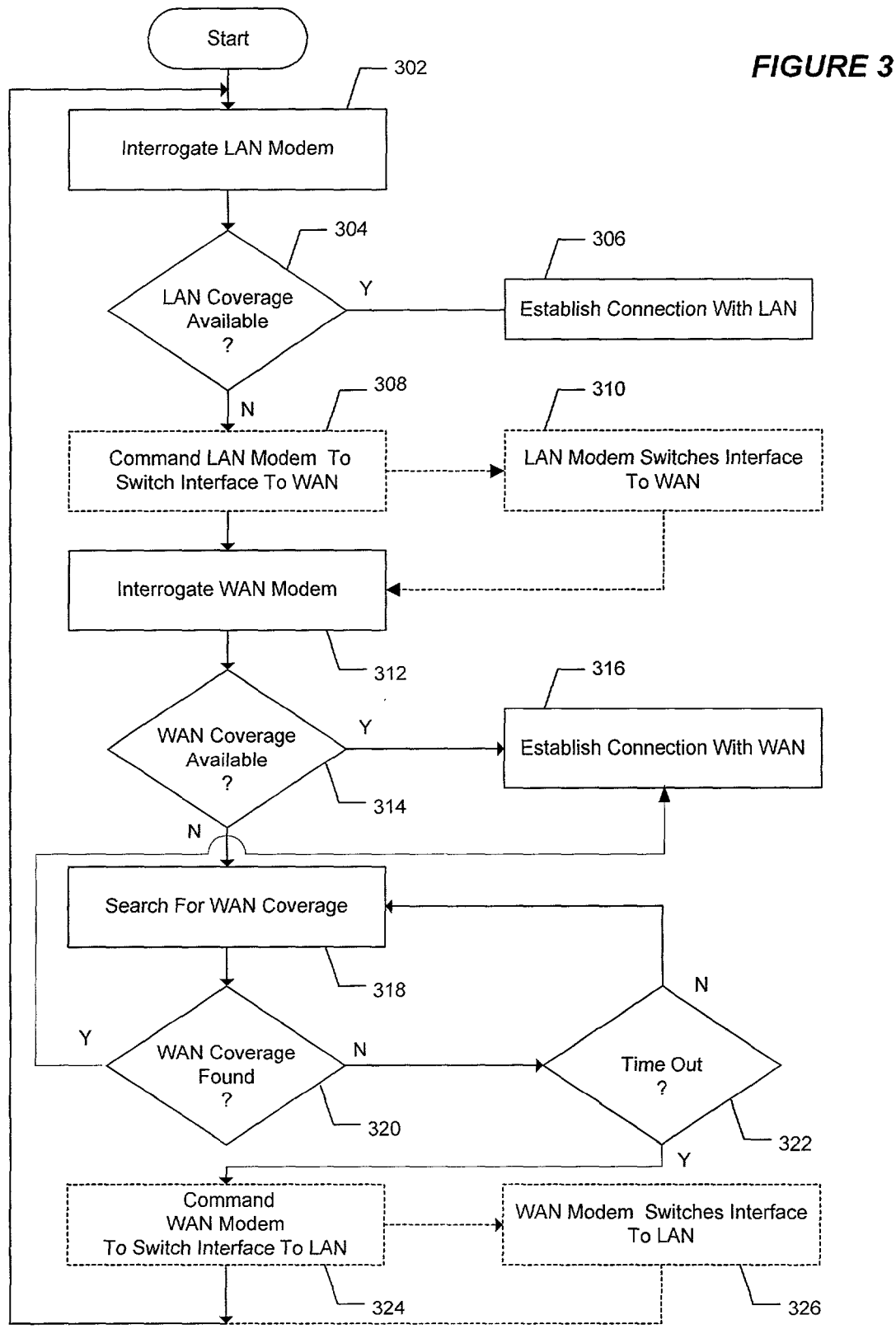
FIG. 3 is a flow chart illustrating on example method of mode control that can be implemented in the multi-mode modem of FIG. 2 in accordance with the invention.

In order to effectively implement each of these modes on one multi-mode modem 200, a control function is required to control the operation of modem devices 210 and 216. Preferably, such a control function is implemented in software. For example, FIG. 3 is a flow diagram illustrating mode selection between a LAN mode and a WAN mode, where the mode selection is controlled by host processor 204 running software resident on host device 202. As such, host device 200 includes a memory (not shown) in which the software instructions accessed by processor 204 to implement the control function are stored.

In step 302, LAN modem device 210 is enabled and host controller 204 interrogates LAN modem device 216 to determine, among possibly other status information, if LAN coverage is available. If LAN coverage is available, step 304, then multi-mode modem 200 establishes a connection with a LAN access point compatible with LAN modem device 216 in step 306. If no LAN coverage is available, step 304, then in process block 308, host processor 204 commands LAN modem device 216 to switch interface 208 to WAN mode. Switching interface 208 is dependent on the implementation of interface 208. Specific implementations of interface 208 are described below. In step 310, LAN modem device 216 switches interface 208 to WAN mode. Both of steps 308 and 310 are for an embodiment of multi-mode modem 200 having a multiplexer (described below) as a component of interface 208, and are therefore optional steps as diagrammed by the dashed borders in FIG. 3.

Now, in step 312, WAN modem device 216 is amended and host processor 204 interrogates WAN modem device 210 to determine, among possibly other status information, if WAN coverage is available. If WAN coverage is available, step 314, then multi-mode modem 200 establishes a connection with a WAN base station compatible with WAN modem device 210, step 316. If no WAN coverage is available, step 314, then in step 318 WAN modem device 210 initiates a search for WAN coverage until WAN coverage is found, step 320, or the search times out, step 322. If searching for WAN coverage has not timed out and WAN coverage is finally found, step 320, then host processor 204 commands WAN modem device 210 to establish a connection with a WAN base station, step 316. If no WAN coverage is found and the searching period has timed out, host interface processor 204 commands WAN modem device 210 to switch interface 208 to LAN mode in step 324. In step 326, WAN modem device 210 switches interface 208 to LAN mode and the process reverts to step 302. Both of steps 324 and 326 are for an embodiment of multi-mode modem 200 having a multiplexer (described below) as a component of interface 208, and are therefore optional steps as diagrammed by the dashed borders in FIG. 3.

If on the other hand, the control function is going to place modem 200 in LAN-WAN simultaneous or gateway mode, then after a LAN connection is established in step 308, for example, processor 204 can instruct WAN modem device 210 to establish a WAN connection in step 316. Once both connections are established, either simultaneous communication or gateway communication can occur. Further, processor 204, or the control function being executed, can acquire status information from both devices 210 and 216 simultaneously. This can be accomplished in several ways. For example, one way is to have both modem devices 210 and 216 simultaneously enabled and reporting status to processor 204. Processor 204 can then determine what connections to make based on the reported information. Alternatively, one of the devices 210 and 216 can be enabled, with or without a connection and processor 204 can periodically cause the other device to be enabled and to report status information. Processor 204 can then make connection determinations based on the reported information.

Figure 4:
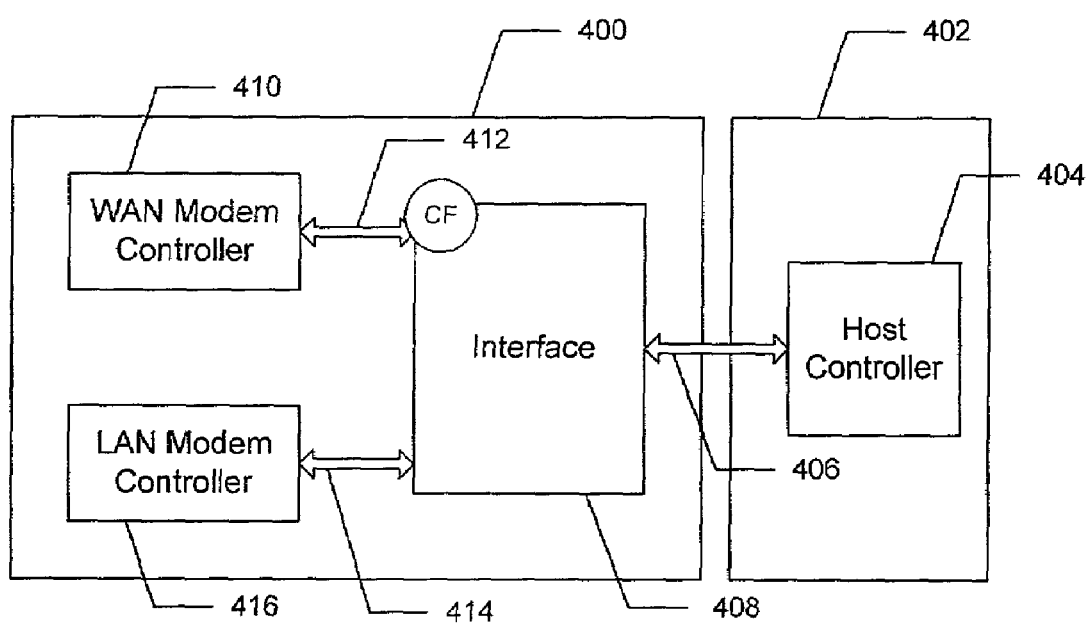
FIG. 4 is a logical block diagram illustrating another example embodiment of a multi-mode modem that can be used in the wireless communication systems of FIG. 1 in accordance with the invention.
Figure 5:
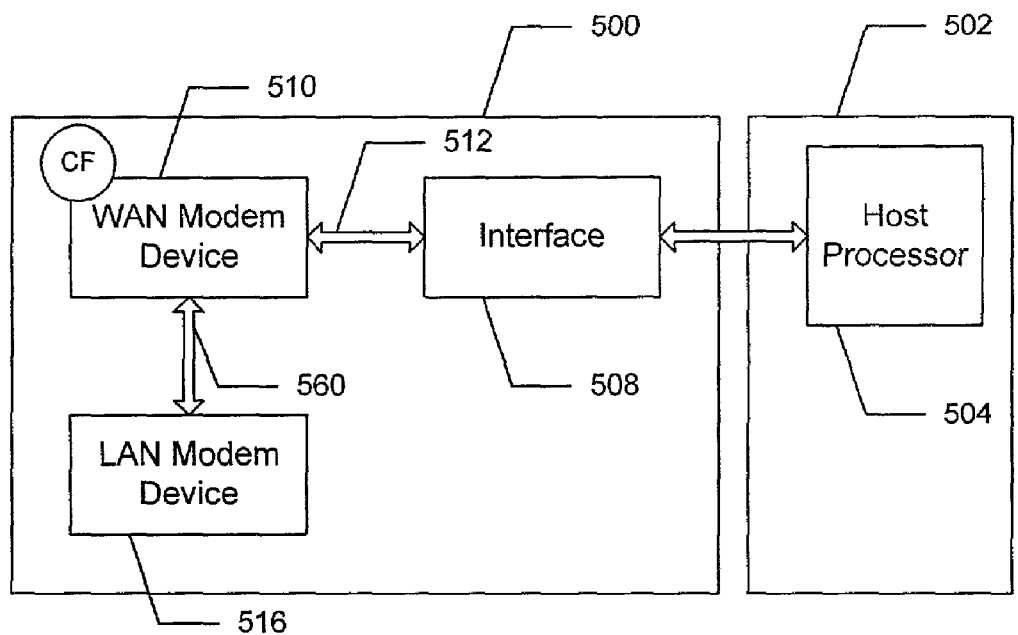
FIG. 5 is a logical block diagram illustrating still another example embodiment of a multi-mode modem that can be used in the wireless communication systems of FIG. 1 in accordance with the invention.
Figure 6:
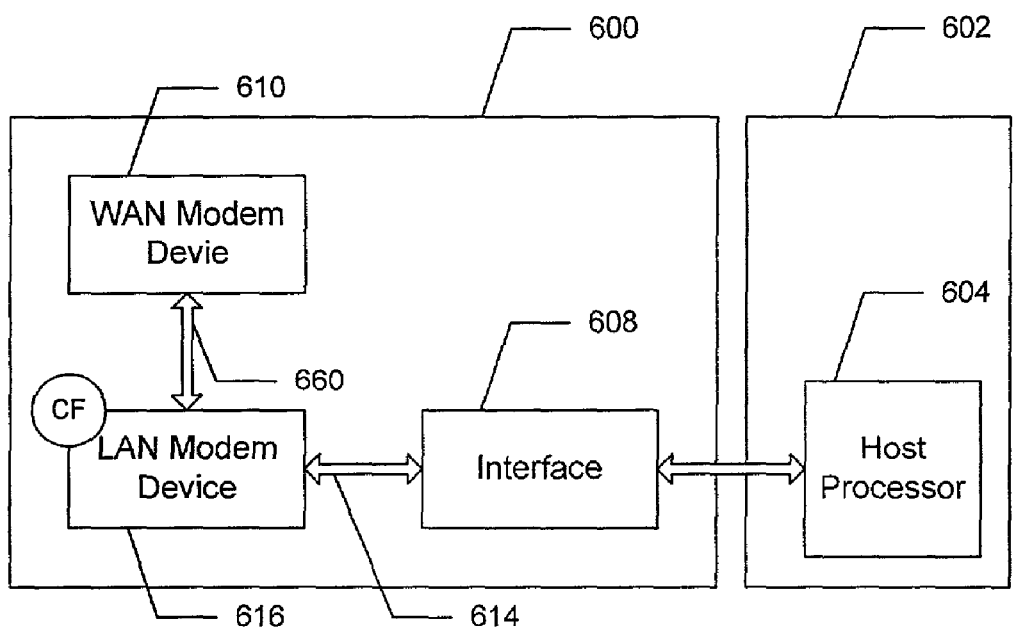
FIG. 6 is a logical block diagram illustrating still another example embodiment of a multi-mode modem that can be used in the wireless communication systems of FIG. 1 in accordance with the invention.
Figure 7:
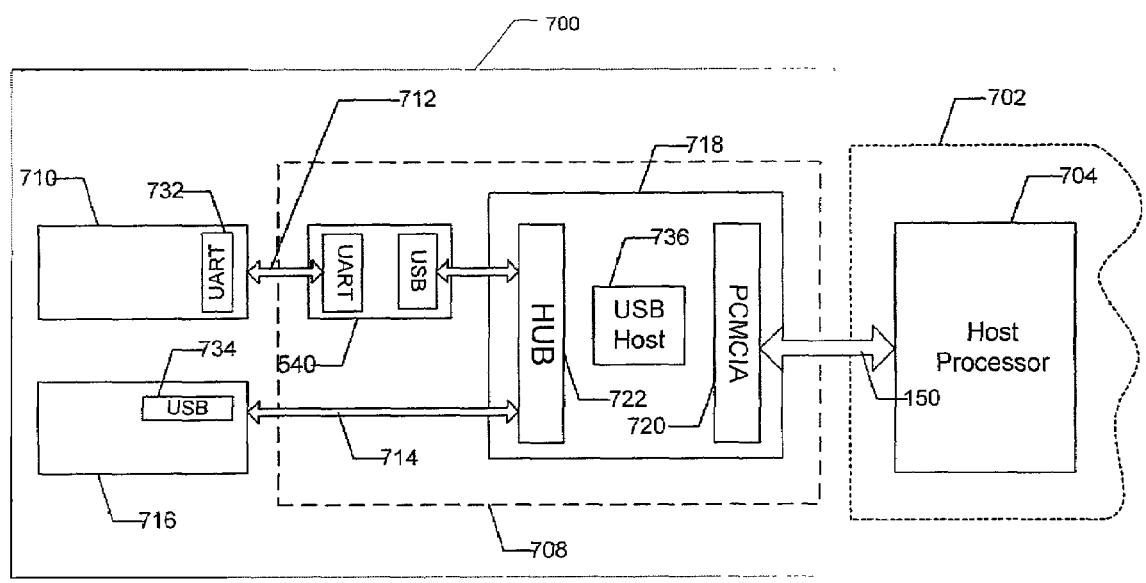
FIG. 7 is a logical block diagram illustrating an example embodiment of a multi-mode modem that can be implemented in a PCMIA modem card in accordance with the invention.

The control function (CF) does not need to be executed on host processor 204. For example, FIG. 4 represents an architectural embodiment having at least part of control function (CF) resident within interface 408. In this embodiment, mode control and configuration of multi-mode modem 400 is implemented within an existing chip as part of interface 408, or within a separate chip (not shown). FIG. 6 and FIG. 7 represent two other architectural embodiments where control function (CF) is resident within WAN modem device 510 (FIG. 5) and LAN modem device 616 (FIG. 6) respectively. In these two embodiments, control function (CF) resides within the baseband processing sections of the respective modem controllers 510 and 616. For example, mode control functionality can be included in an ARM7 or an ARM9 processor within WAN or LAN modem devices 510 and 616. In these embodiments, an additional bus 560 and 660 is preferably included to link WAN modem device 510 with LAN modem device 516 and to link LAN modem device 616 with WAN modem device 610. Buses 560 and 660 allow the control function (CF) to more efficiently query the opposite modem device and to pass instructions thereto.

Several specific implementations will now be described, beginning with the PCMCIA card implementation illustrated in FIG. 7. In FIG. 7, multi-mode modem 700 includes an interface device 708 configured to interface modem 700 with host processor 704 in host device 702. Because modem 700 is included in a PCMCIA card, interface 706 between interface device 708 and host processor 704 is necessarily a PCMCIA interface. Once the PCMCIA signals are received from interface 706, device 708 is configured to convert them into the appropriate format for communication with modem devices 710 and 716, which are again assumed to be a WAN and LAN device, respectively. The appropriate communication format for modem devices 710 and 716 will depend on the particular baseband implementations included therein. In the specific implementation of FIG. 7, it is assumed that the baseband section of WAN modem device 710 comprises a Universal Asynchronous Receiver Transmitter (JART) 732 for communication over interface 712 and that the baseband section of LAN modem device 716 comprises a Universal Serial Bus (USB) controller 734 for communicating over interface 714. Other baseband implementations are, of course, possible; however, many conventional WAN modem devices include a UART 732 and many conventional LAN modem devices include a USB controller 732. Therefore, for this, and the example implementations that follow, such implementations will be assumed. But the example implementations described herein are for illustration only and should not be seen as limiting the systems and methods described herein to any particular implementation or implementations.

Therefore, interface device 708 must convert the PCMCIA signals received from interface 706 into UART signals and USB signals for communication with modem devices 710 and 716 respectively. One way to do this, as illustrated in FIG. 7, is to include a USB host 736 in device 708 configured to convert the PCMCIA signals to USB signals, which are then sent to HUB interface 722. HUB interface 722 can then send the signals intended for modem device 716 directly to USB controller 734 over interface 714. The signals intended for modem device 710, however, can be sent to a bridge circuit 724 configured to convert the USB signals to UART signals that can be sent to UART 732 over interface 712.

Signals from LAN modem device 716 are sent to HUB interface 722, which forwards them to USB host 736 so that they can be converted to PCMCIA signals and sent to host processor 704. Signals from WAN modem device 710 are first sent to bridge circuit 724, which converts them to USB signals and sends them to HUB interface 722. HUB interface 722 again forwards the USB signals to USB host 736 for conversion to PCMCIA signals. Thus, USB host 736 and HUB 722 preferably control the flow of signals to and from modem devices 710 and 716, eliminating the need for bulky interface switching mechanisms.

Preferably, Interface device 708 actually comprises two integrated circuit chips: one comprising bridge circuit 724, and one application specific integrated circuit (ASIC) comprising HUB interface 722, USB host 736, and PCMJA interface 720. Alternatively, all of the circuits can be included in a single ASIC, or some or all of the circuits can be included as separate components depending on the implementation. Further, in the implementation of FIG. 7, host processor 704 is able to communicate directly with WAN modem device 710 and LAN modem device 716 without the need for bulky interface switching mechanisms. As such, optional steps 308, 310, 324, and 326 in FIG. 3 are not required for PCMCIA multi-mode modem 700. Therefore, such a PCMCIA card implementation is preferable, because it reduces the signaling complexity and eliminates any bulky switching circuits.

Figure 8:
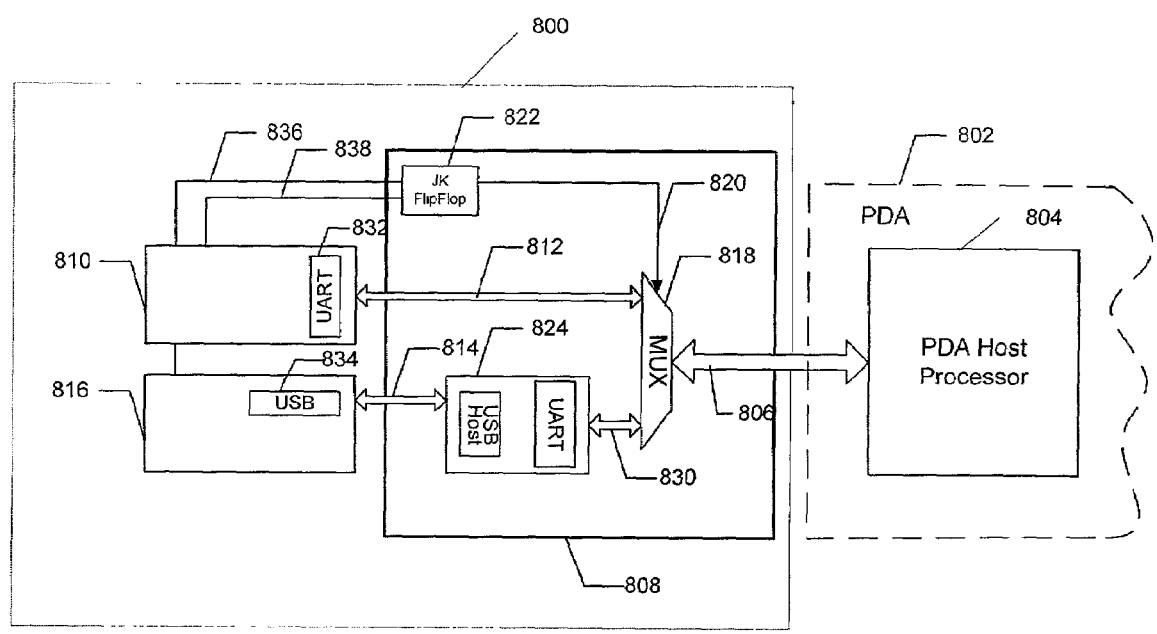
FIG. 8 is a logical block diagram illustrating an example embodiment of a multi-mode modem that can be implemented in a module for use with a PDA in accordance with the invention.

In certain implementations, such as PDA implementations for example, switching mechanisms may be unavoidable. Thus, FIG. 8 illustrates an example embodiment of a multi-mode modem 800 for use in conjunction with a PDA host device 802, which includes PDA host processor 804. As will often be the case, PDA host processor 804 comprises a UART (not shown) for communicating with modem 800 over interface 806. Thus, PDA host processor 804 will be able to communicate directly with UART 832 in WAN modem device 810 over interface 812. To communicate with LAN modem device 816, however, interface device 808 preferably includes bridge circuit 824 configured to convert UART signals to USB signals and vice versa. The USB signals can then be sent to USB controller 834 over interface 814.

Unlike modem 700, however, some switching mechanism for controlling the flow of signals to and from modem device 810 and 816 should be included in interface device 808. Thus, in this particular example, interface device 808 comprises Multiplexer (MUX) 806, which is controlled by modem devices 810 and 816. It should be noted that MUX 806 could be controlled by PDA host processor 804, but this would require that interface 806 be modified to include the appropriate control line(s) and that the software being executed by processor 804 be modified to include a control routine. The typical multi-mode modem manufacturer may not be able to effect such changes and there may not be a way to ensure that all PDA manufacturers implement the changes in a uniform manner. Therefore, the implementation illustrated in FIG. 8 may be preferable. It should also be noted, however, that as PDA devices begin to incorporate USB support, the implementation of FIG. 7 can be used in connection therewith, thus eliminating the need for MUX 806 an flip-flop 822.

J-K flip-flop 822 can be included in interface device 808 to allow modem devices 810 and 816 to control MUX 822 via control lines 836, 838, and 820. For this implementation, optional steps 308, 310, 324, and 326 in FIG. 3 are required. Thus, when the processor 804 instructs LAN modem device 816 to switch the interface to WAN mode (step 308), LAN modem device 816 can toggle control line 838, causing the output 820 of flip-flop 822 to transition and thereby cause the MUX output to switch from interface 830 to interface 812 (step 310). Similarly, when processor 804 instructs WAN modem device 810 to switch the interface to LAN mode (step 324), WAN modem device 810 can toggle control line 836, causing the output 820 of flip-flop 822 to transition and thereby cause the MUX output to switch from interface 812 to interface 830 (step 326).

Preferably, some or all of the components included in interface device 808 can be integrated into a single ASIC. Alternatively, some or all of the components that comprise interface device 808 can be included in separate devices. The requirements of the particular implementation will typically determine what level of integration is required.

Figure 9:
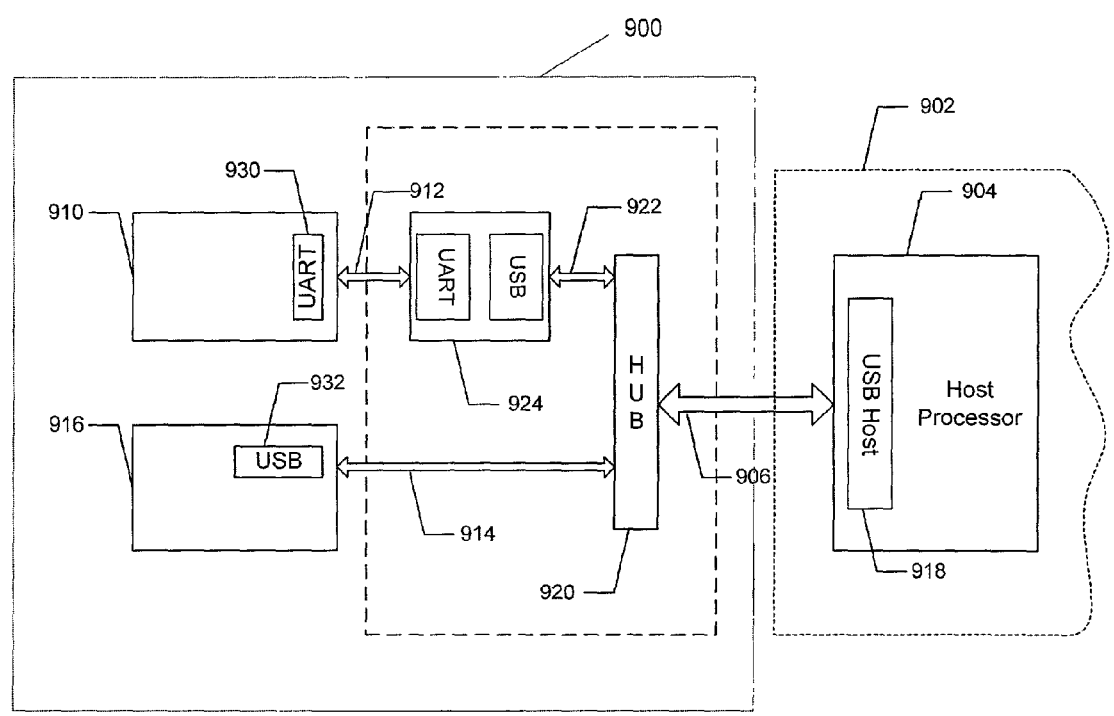
FIG. 9 is a logical block diagram illustrating an example embodiment of a multi-mode modem that can be implemented in a Multiport card in accordance with the invention.

FIG. 9 illustrates a final example embodiment of a multi-mode modem 900 that implements Compaq's Multiport standard. In this case, host device 902 will be a personal or laptop computer that includes a Multiport slot. As such, host processor 904 will include a USB controller 918. Therefore, interface device 908 can simply include HUB interface 920, which will operate similarly to HUB device 722, and bridge circuit 924, which will operate similarly to bridge circuit 724. Thus, interface device 908, which can comprise a single ASIC or multiple chips, will be even more compact and less costly than interface device 708. Although, the Multiport standard is probably less universal than the PCMCIA standard.

Figure 10:
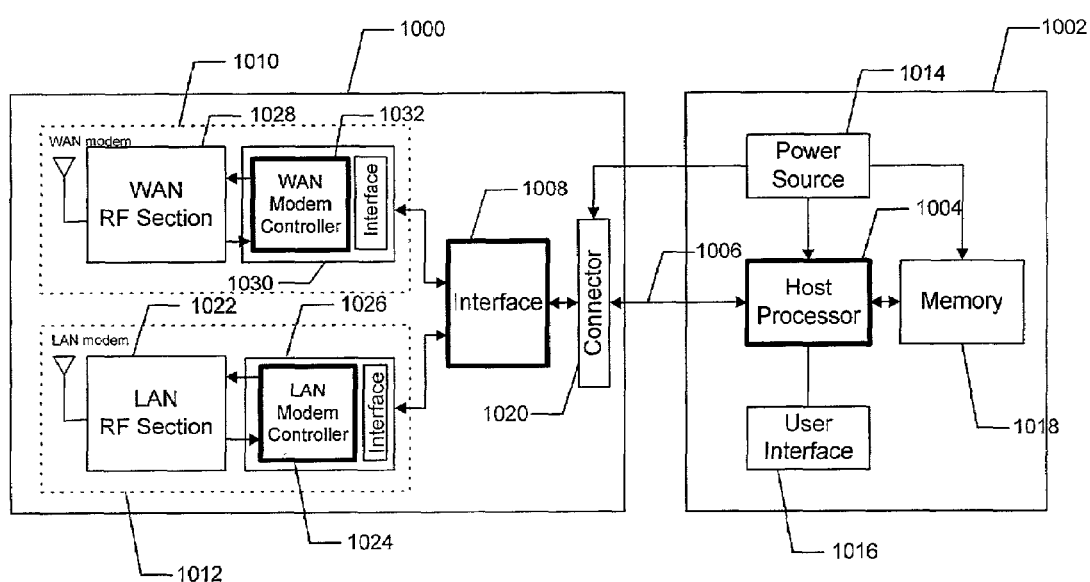
FIG. 10 is a logical block diagram illustrating one example embodiment of a multi-mode modem in more detail.

FIG. 10 is an exemplary high-level architectural block diagram showing the components of a multi-mode modem 1000 and host 1002 in greater detail. Multi-mode modem 1000 comprises WAN modem device 1010, LAN modem device 1016, interface device 1008, and connector 1020. WAN modem device 1010 further includes WAN RF section 1028 and WAN baseband section 1032. Similarly, LAN modem device 1016 further includes LAN RF section 1022 and LAN baseband section 1026. WAN RF section 1028 is responsible for mixing a message data stream with a carrier signal for transmission over a WAN air interface. Similarly LAN RF section 1022 is responsible for mixing a message data stream with a carrier signal for transmission over a LAN air interface. WAN baseband section 1032 and LAN baseband section 1026 comprise WAN modem controller 1032 and LAN modem controller 1024 respectively for facilitating mode selection and interfacing with interface device 1008.

Host device 1002 can comprise power source 1014, memory 1018, user interface 1016, and host processor 1004. Power source 1014 provides power to components of both host device 1002 and multi-mode modem 1000. Memory 1018 can be a RAM, ROM or other shared memory device accessible and addressable by host processor 1018 for storing command and control instructions to be executed by processor 1004 in order to control the operation of multi-mode modem 1000. User interface 1016 interfaces with host processor 1004 for sending and receiving messages between the subscriber and multi-mode modem 1000, such as status and error messages.

Multi-mode modem 1000 can be implemented using a number of common form factors, including an external device arrangement whereby host bus 1006 would comprise a serial bus cable, such as a USB cable, for cabling external multi-mode modem 1000 to host 1002. FIGS. 7-9 depict such an external modem arrangement for ease of illustration. However, an internal device arrangement is also possible whereby host bus 1006 could become, for example, a hard-wired bus embedded on a mainboard or expansion printed circuit board (PCB) of host 1002.

Where the control function (CF) is implemented in either WAN modem device 1010 or LAN modem device 1016, WAN modem controller 1031 and LAN modem controller 1024 respectively, will need to be configured in such a manner as to carry out the mode control steps as described above. Also, as described, and additional bus linking the two may be included to facilitate more efficient operation. If the control function is implemented in interface device 1008, then device 1008 may need to include a memory to store the appropriate instructions and a processor configured to implement the instructions.

Thus, various hardware and software implementations have been described, at various levels of abstraction, configured to carry out mode control in accordance with the methods described herein. As mentioned, however, a cost effective approach to integrating multiple modem devices into a single card or modem is also desirable, because it can allow multi-mode modem manufacturers to reduce costs. Further, the method of integration should allow a single multi-mode modem to be produced that can be reconfigured after the manufacturing process for different modem combinations. One way to do this is to use software defined radios. At present, however, this may not be feasible. An alternative method is illustrated in FIG. 11.

Figure 11:
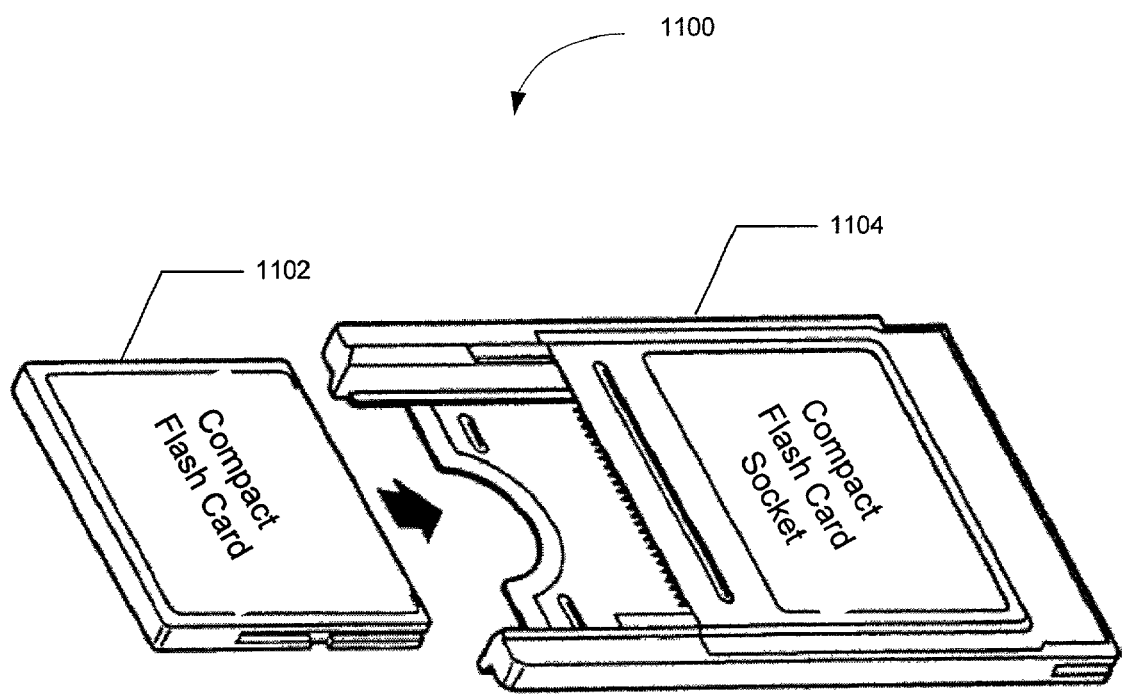
FIG. 11 is a diagram illustrating one example embodiment of a PCMCIA-Compact Flash combination multi-mode modem in accordance with the invention.

FIG. 11 is a perspective view of a PC Card 1100 having Compact Flash card module 1102, and Compact Flash card socket 1104. PC Card 1100 is designed for insertion into a PC Card slot of a portable communication device such as a laptop or palmtop computer. For example, many portable computers ship with a Type II PC Card slot for expanding the computer's functionality, as in allowing memory expansion modules to be inserted, complementing the primary storage capacity of the computer.

Using this form factor, a primary PC Card function and a secondary Compact Flash card function can cooperate within one PC Card slot. Up to fifty percent of the available space occupied by PC Card 1100 is used for the Compact Flash card 1102, leaving approximately fifty percent of the space for implementation of the primary function circuitry. Additional space may be possible by allowing the Compact Flash to extend past the outside edge of PC Card 1100. Implementing a multi-mode modem in such a PC Card embodiment would permit greater user flexibility and ease of configuration than other form factor embodiments due to automatic slot configuration and other capabilities of the PC Card standard.

Any of the multi-mode embodiments previously described having dual modem controllers could be easily implemented in PC Card 1100. Compact flash socket 1104 could contain circuitry including a WAN modem device, while Compact Flash module 1102 could contain circuitry that includes LAN modem device or vise versa.

One embodiment of PC Card 1100 can enable internetwork handoff, particularly LAN-WAN or PAN-WAN handoff. In this embodiment, the primary function would implement a core wireless technology, for instance a WAN technology such as GSM/GPRS or CDMA 1×RTT. Dual modem capability could then be enabled by implementing one or more Compact Flash modules with local or personal network technology such as IEEE 802.11 LAN or Bluetooth™ PAN.

In another embodiment, PC Card 1100 is used to combine a WAN modem with global positioning system (GPS) functionality. In this embodiment, the primary function implemented in Compact Flash socket 1104 would be a WAN technology such as GSM/GPRS for communication services, while the secondary function implemented in Compact Flash module 1102 would be a location service such as GPS for pinpointing the location of the wireless host housing PC Card 1100.

In addition to GPS Compact Flash modules and IEEE 802.11, Bluetooth™, and other types of LAN/PAN Compact Flash modules, there are several other types of Compact Flash modules that can be implemented in Compact Flash module 1102. For example, there are Ethernet LAN modules, standard 56k modem modules, and bar code scanner modules. Further, many more types of modules will undoubtedly be developed in the future that will be capable of implementation in Compact Flash module 1102. It should be noted that in the case of bar scanner modules, for example, the module does not communicate with a communication system per say. But for this specification and the claims that follow, the bar code, the data that it comprises, and the physical connection, which in the case of a bar code scanner is typically an optical connection, can be said to comprise a communication system. Thus, it can generally be said, by similarly defining communication system for other types of modules that do not communicate with a communication system per say, that Compact Flash module 1102 always comprises a device configured to communicate with a communication system.

Mode switching between the devices of Compact Flash module 1102 and Compact Flash socket 1104 can be accomplished by a software or firmware driver that expands and complements the functionality of the existing PC Card driver interface. For example, a driver to implement mode selection and control in PC Card 1100 would be written to accomplish such tasks as bus arbitration, memory storage and retrieval, status and message coding/decoding, power usage, interrogation, and signaling. A mode switching driver also would perform and understand any required bridging and multiplexing functionality. Memory for storing a software driver could be borrowed from the host device or included in PC Card socket 1104 or as part of Compact Flash card module 1102.

Several additional advantages accrue from the PC Card 1100 form factor embodiment. First, combining existing technologies, i.e., and existing, standardized form factor, to implement a multi-mode modem improves overall product life cycle efficiency by side-stepping the introduction of a novel form factor. Second, PC Card technology is reliable, having been in the marketplace for a number of years. Third, certification and approval by the various government-sponsored regulatory bodies is easier because PC Card and Compact Flash technologies are known, helping to focus testing to an isolated and identifiable feature set. Fourth, it allows the manufacturer to produce a single, or a minimum number of, PC card product(s). The single PC card product will incorporate the primary functionality such as a WAN modem device. Various technology combinations can then be produced by installing the appropriate Compact Flash module. Thus, manufacturing process and costs can be streamlined, while still providing the benefit of multiple multi-mode mode combinations.

Furthermore, for supporting audio and voice applications, PC Card 1100 can be equipped with a headphone or earphone jack. Other useful components to PC Card 1100 include an antenna (not shown) attached to, and possibly shared by a LAN modem RF section and a WAN modem RF section as well as one or more LED's (not shown) for indicating status and call processing.

Figure 12:
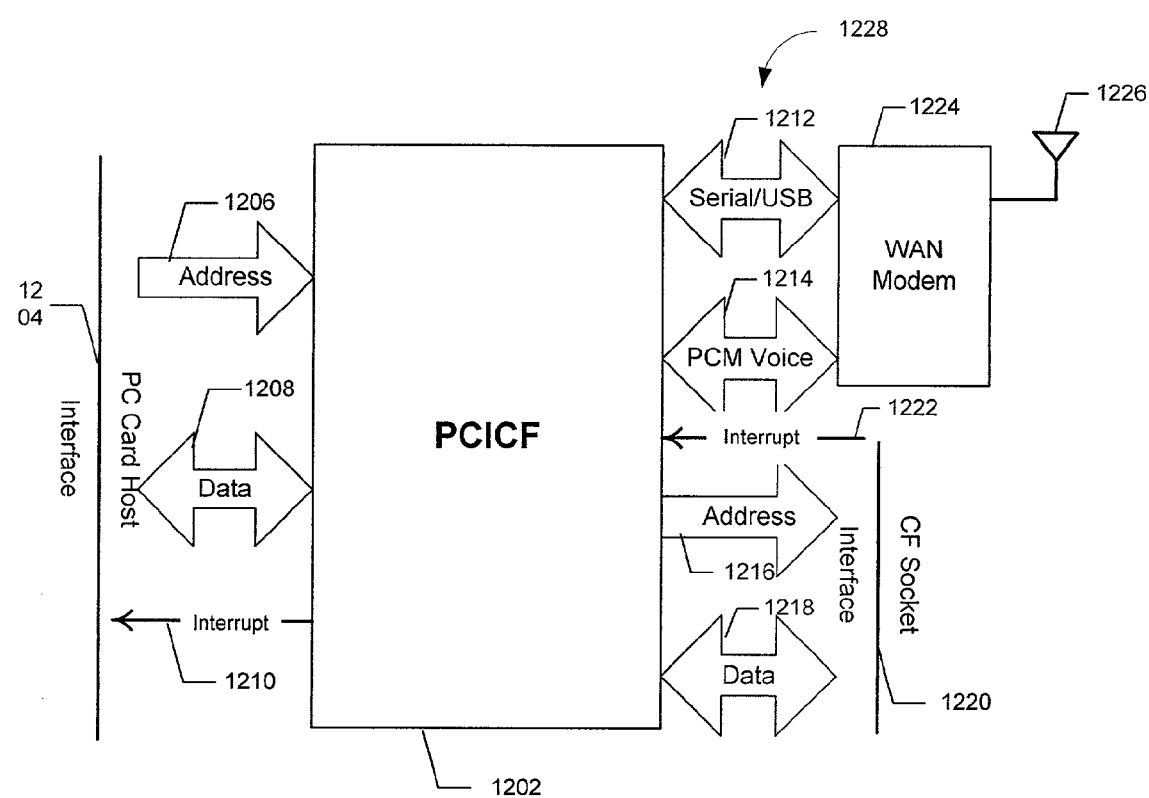
FIG. 12 is a logical block diagram illustrating one example embodiment of an interface device that can be used in the PCMCIA-Compact Flash combination multi-mode modem of FIG. 11 in accordance with the invention.

In order to implement mode control as described above, PC Card socket 1104 preferably includes an interface device configured to perform the signal conversion, routing, and switching that may be required. FIG. 10 illustrates a one example embodiment of such an interface device 1202. In one configuration, In the example illustrated in FIG. 12, it is assumed that PC Card socket 1104 comprises a WAN modem device and that PC Card 1102 includes a LAN modem device. This is for illustration only, however, and is not intended to limit PC Card 1100 to any particular configuration.

As such, interface device 1202 includes a PC card host interface 1204, a WAN interface 1228 and a LAN, or CF socket interface, 1220. As can be seen, host interface 1204 can include address and data lines 1206 and 1208, respectively. WAN interface 1228 can include serial 1212, and CF socket interface 1220 can include address and data lines 2116 and 1218, respectively.

In one embodiment, interface device 1202 communicates serially over serial/USB bus 1212 with WAN modem device 1224 having antenna 1226. However, interface device 1202 interface to WAN modem device 1224 can also be configured according to other communication standards and protocols such as peripheral component interconnect (PCI) or the 16550 serial standard. Serial/USB bus 1212 may also require bridging, depending on the capabilities of WAN modem device 1224 and interface device 1202. For application supporting voice communication, PC Card 1100 can provide pulse code modulation (PCM) over voice bus 1214 to WAN modem 1224.

Preferably, CF socket interface 1220 is interrupt driven, as indicated by interrupt control line 1222. Interface device 1202 responds to CF socket interface 1220 when Compact Flash card 1102 issues an interrupt request. If the control function (CF) resides with interface device 1202, then interface device 1202 would monitor common resources like interrupt handling and other bus arbitration tasks.

Interface device 1202 also supports a PC Card host interface 1204 with a host device. The host device in this instance would be a computer having a Type II PC Card slot into which PC Card 1100 is inserted. PC Card host interface 1204 comprises address bus 1206 and data bus 1208 for accessing CF socket data. PC Card host interface 1204 is also preferably interrupt-driven as indicated by interrupt control line 1210. PC Card interface 1204 responds to interface device 1202 when CF socket interface 1220 issues an interrupt request. Therefore, interface device 1202 preferably acts as a bus pass-through that provides a PC Card to Compact Flash conversion.

Thus, the PC Card form factor would satisfy the development of a combination modem having a GSM/GPRS modem core deployed in card socket 1104, and an 802.11 card as the LAN modem deployed in Compact Flash module 1102. In similar fashion, the a CDMA modem core could replace the GSM/GPRS modem core. In still other embodiments, an emerging array of products, e.g., from Socket Communications, Inc. and others, have hit the market that would be suitable for implementation in PC Card 1100. For example, the Bluetooth™ Card Compact Flash and the In-Hand Scan Card™ for hand-held scanning, both from Socket Communications Inc., are possible combination technologies.

Therefore, by incorporating the systems and methods described above, several existing problems are overcome allowing a subscriber to have access to the most convenient and optimal service at any given time, using a single combinational modem device that can be easily reconfigured for different technology combinations after the manufacturing process. Such advancement is provided using the systems and methods described herein, which present software and hardware architectures that can effectively support various technology combinations, methods for configuring the hardware and software architectures to achieve the most optimal operation, and cost effective methods to incorporate multiple technologies within modem devices in a manner that allows for easy reconfiguration after the manufacturing process.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A multi-mode modem card comprising a standard form factor and configured to interface with a host device, the multi-mode modem card including:
   a primary modem card configured to communicate with a first communication system;
   an interface configured to receive a secondary modem card comprising a smaller form factor than the primary modem card, the secondary modem card including a secondary device configured to communicate with a second communication system; and
   an interface device configured to interface the primary and secondary modem cards with a host processor in the host device, wherein the interface device comprises:
   a host device interface;
   a primary device interface; and
   a secondary device interface;
   wherein the primary device interface is a serial data interface, and wherein the interface device is further configured to receive address and data information from the host device and convert it into serial data that can be communicated over the primary device interface.

2. The multi-mode modem card of claim 1, wherein the host device interface comprises address and data lines.

3. The multi-mode modem card of claim 1, wherein the interface device is further configured to receive data information from the primary device interface and convert it into data and address information that can be communicated over the host device interface.

4. The multi-mode modem card of claim 3, wherein the primary device interface is a universal serial bus interface.

5. The multi-mode modem card of claim 4, wherein the primary device interface includes a pulse code modulation interface for voice data.

6. The multi-mode modem card of claim 1, wherein the secondary device interface comprises address and data lines, and wherein the interface device is configured to interface the address and data lines on the host processor interface with the address and data lines on the secondary device interface.

7. The multi-mode modem card of claim 1, wherein the secondary device interface is a Compact Flash interface, and wherein the secondary modem card is a Compact Flash modem card.

8. A system for wireless communication, comprising:
a host device comprising a processor;
a multi-mode modem card comprising a standard form factor configured to interface with the host device, the multi-mode modem card including:
a primary device configured to communicate with a first communication system, and
an interface configured to receive a secondary modem card comprising a smaller form factor than the multi-mode modem card, the secondary modem card including a secondary device configured to communicate with a second communication system, and
an interface device coupled with at least one of the primary and secondary devices, the interface device configured to interface the primary and secondary devices with the host processor; and
a control function configured to place the multi-mode modem card in one of the following communication modes:
communication with the first communication system, or
communication with the second communication system
wherein the control function is further configured to place the multi-mode modem in simultaneous communication with both the first and second communication systems; and
wherein the interface device comprises:
a host device interface;
a primary device interface; and
a secondary device interface
wherein the primary device interface is a serial data interface, and wherein the interface device is further configured to receive address and data information from the host device and convert it into serial data that can be communicated over the primary device interface.

9. The system of claim 8, wherein the processor comprises the control function.

10. The system of claim 9, wherein the interface device is configured to interface the processor with the primary device, and wherein the control function is configured to:
query the primary device to determine if communication with the first communication system is available; and
query the secondary device to determine if communication with the second communication system is available.

11. The system of claim 10, wherein the control function is further configured to query the second device only if communication with the first communication system is not available.

12. The system of claim 8, wherein the host device interface comprises address and data lines.

13. The system of claim 8, wherein the interface device is further configured to receive data information from the primary device interface and convert it into data and address information that can be communicated over the host device interface.

14. The system of claim 13, wherein the primary device interface is a universal serial bus interface.

15. The system of claim 14, wherein the primary device interface includes a pulse code modulation interface for voice data.

16. The system of claim 8, wherein the secondary device interface comprises address and data lines, and wherein the interface device is configured to interface the address and data lines on the host device interface with the address and data lines on the secondary device interface when required.

17. The system of claim 8, wherein the secondary device interface is a Compact Flash interface, and wherein the secondary modem card is a Compact Flash modem card.

18. A system for wireless communication, comprising:
a host device comprising a processor;
a multi-mode modem card comprising a standard form factor configured to interface with the host device, the multi-mode modem card including:
a primary device configured to communicate with a first communication system, and
an interface configured to receive a secondary modem card comprising a smaller form factor than the multi-mode modem card, the secondary modem card including a secondary device configured to communicate with a second communication system, and
an interface device coupled with at least one of the primary and secondary devices, the interface device configured to interface the primary and secondary devices with the host processor; and
a control function configured to place the multi-mode modem card in one of the following communication modes:
communication with the first communication system, or
communication with the second communication system
wherein the control function is further configured to place the multi-mode modem in simultaneous communication with both the first and second communication systems;
wherein the control function is further configured to place the multi-mode modem in gateway communication between the first and second communication systems.

* * * * *